(12) United States Patent
Kumhyr

(10) Patent No.: US 9,046,928 B2
(45) Date of Patent: Jun. 2, 2015

(54) METHOD AND APPARATUS FOR IMPROVED TEXT ENTRY

(71) Applicant: International Business Machines Corporation, Armonk, NY (US)

(72) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 13/778,854

(22) Filed: Feb. 27, 2013

(65) Prior Publication Data

US 2014/0245212 A1 Aug. 28, 2014

(51) Int. Cl.
*G06F 3/048* (2013.01)
*G06F 3/01* (2006.01)

(52) U.S. Cl.
CPC ....................... *G06F 3/017* (2013.01)

(58) Field of Classification Search
CPC ....................................... G06F 3/017
USPC ........................................... 715/773
See application file for complete search history.

(56) References Cited

U.S. PATENT DOCUMENTS

| | | | | |
|---|---|---|---|---|
| 5,128,672 | A * | 7/1992 | Kaehler | 341/23 |
| 6,573,844 | B1 * | 6/2003 | Venolia et al. | 341/22 |
| 7,250,938 | B2 | 7/2007 | Kirkland et al. | |
| 7,616,191 | B2 | 11/2009 | Matta | |
| 8,044,827 | B2 | 10/2011 | Jarczyk | |
| 8,232,973 | B2 | 7/2012 | Kocienda et al. | |
| 8,345,017 | B1 * | 1/2013 | Cho | 345/173 |
| 2006/0228149 | A1 * | 10/2006 | Harley | 400/486 |
| 2011/0078613 | A1 * | 3/2011 | Bangalore | 715/773 |
| 2012/0203544 | A1 | 8/2012 | Kushler | |
| 2013/0271385 | A1 * | 10/2013 | Griffin et al. | 345/173 |
| 2014/0078065 | A1 * | 3/2014 | Akkok | 345/169 |

OTHER PUBLICATIONS

IPCOM00020873D, "System and Method for Increased Virtural Soft Keyboard Entry Efficiency", (5 pages w/ cover sheet), Oct. 27, 2010.

\* cited by examiner

*Primary Examiner* — Omar Abdul-Ali

(74) *Attorney, Agent, or Firm* — Damion Josephs; Daniel E. McConnell

(57) ABSTRACT

A method and apparatus which improves QWER-sive text input into an information handling system by gestures on or above a keyboard layout. It is known that languages have a characteristic frequency at which characters will appear. Relying upon such characteristics, a keyboard layout is generated in such a way that the area allocated to individual characters varies among the character set with larger areas being assigned to characters more likely to be used in a language selected by a user. Such enlargement of areas of response may either be visible to the user or concealed, in which latter case all of the individual characters appear to have been allocated areas of the same size.

18 Claims, 4 Drawing Sheets

METHOD AND APPARATUS FOR IMPROVED TEXT ENTRY

FIELD AND BACKGROUND OF INVENTION

There presently exist methods for facilitating text entry by gestures and information handling devices such as computer systems of various sorts which implement such methods. Such methods and devices are described in prior U.S. Pat. No. 7,250,938 (to which the interested reader is referred and which is hereby incorporated by reference into this disclosure to any extent necessary or appropriate to full understanding of what follows) and are commercially available under product names such as Swype and Shapewriter.

Such prior teachings provide a user input mechanism that allows a user to enter words as gestures on a virtual keyboard. The user input mechanism combines two existing and prevalent forms of user input: cursive handwriting and keyboard input. A familiar keyboard layout is generated and presented. A user then may use an implement, such as a stylus or the user's finger, to indicate characters in the display. Typically with a touch screen implementation, the implement will first touch the screen at a position of a first character in a word. The user will then move the implement along the surface of the display from character to character, spelling out a word. Character recognition is detected by either entry into the bounds of the virtual key box or alternatively by the relative shape of the word stroke. However the bounding of the key box can result in stroke patterns that are wildly different from each other so that multiple alternates need to be presented to the user in order to resolve ambiguities. A "choose the correct word" function.

SUMMARY OF THE INVENTION

What is here taught improves the resolution of ambiguities by using technologies based on the frequency at which letters are used in a language selected by the user. It is known that languages have a characteristic frequency at which letters will appear (as will be expanded upon hereinafter). Relying upon such characteristics, a keyboard layout is generated in such a way that the area allocated to individual characters varies among the character set with larger areas being assigned to characters more likely to be used in a language selected by a user. Such enlargement of areas of response may either be visible to the user or concealed, in which latter case all of the individual characters appear to have been allocated areas of the same size.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
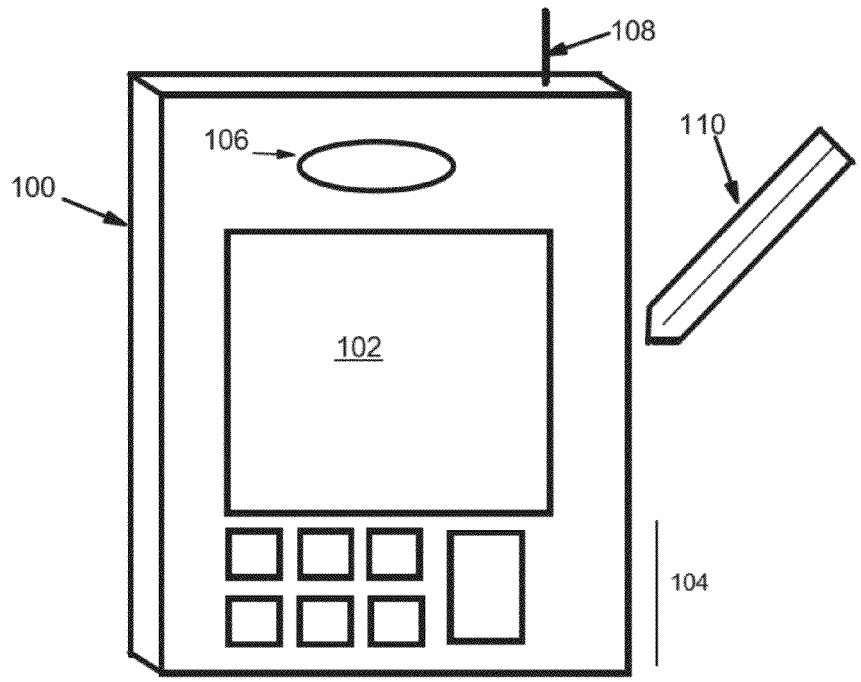
FIG. 1 is a representation of a device with which the present technology may be implemented.

With reference now to FIG. 1, a simplified diagram of a personal computing device is depicted in accordance with a preferred embodiment of the present invention. Personal computing device 100 includes a display 102 for presenting textual and graphical information. Display 102 may be a known display device, such as a liquid crystal display (LCD) device. The display may be used to present a map or directions, calendar information, a telephone directory, or an electronic mail message. In an exemplary embodiment of the present invention, screen 102 may be a touch screen device that receives user input using an Implement such as, for example, stylus 110.

Personal computing device 100 may also include keypad 104, speaker 106, and antenna 108. Keypad 104 may be used to receive user input in addition to using screen 102. Speaker 106 provides a mechanism for audio output, such as presentation of an audio file. Antenna 108 provides a mechanism used in establishing a wireless communications link between personal computing device 100 and a network. Associated device drivers and wireless communications means are not explicitly shown in FIG. 1.

Personal computing device 100 also preferably includes a graphical user interface that may be implemented by means of systems software residing in computer readable media in operation within personal computing device 100.

In accordance with a preferred embodiment of the present invention, a user input mechanism is provided that allows a user to enter words as gestures on a virtual keyboard presented on the display device. The user input mechanism of the present invention combines elements of two existing and prevalent forms of user input: cursive handwriting and keyboard input. A familiar keyboard layout is presented on the display. A user then may place an implement, such as a stylus or the user's finger, in contact with the display. Typically, the implement will first touch the screen at a position of a first character in a word. The user then may move the implement along the surface of the display from character to character, spelling out a word. In time, the user will learn the patterns on the virtual keyboard for each word. With even greater familiarity, the display of the virtual 10 keyboard may become superfluous for expert users.

Figure 2:
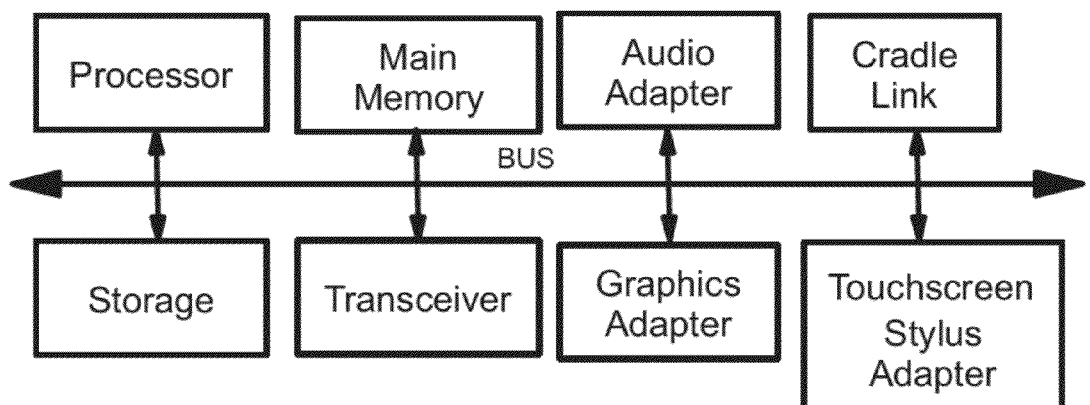
FIG. 2 is a representation of certain hardware elements of the device of FIG. 1.

Turning now to FIG. 2, a block diagram of a personal computing device is shown in accordance with a preferred embodiment of the present invention. Personal computing device 200 is an example of a computing device, such as personal computing device 100 in FIG. 1, in which code or instructions implementing the processes of the present invention may be located. Personal computing device 200 includes a bus 206 to which processor 202 and main memory 204 are connected. Audio adapter 208, graphics adapter 210, touch screen/stylus adapter 212, transceiver 214, and storage 216 also are connected to bus 206.

Cradle link 218 provides a mechanism to connect personal computing device 200 to a cradle used in synchronizing data in personal computing device 200 with another data processing system. Further, touch screen/stylus adapter 212 also includes a mechanism to receive user input as a stylus makes contact with a touch screen display.

An operating system runs on processor 202 and is used to coordinate and provide control of various components within personal computing device 200 in FIG. 2. The operating system may be, for example, a commercially available operating system such as Windows CE, which is available from Microsoft Corporation, Linux, or PalmOS. Instructions for the operating system and applications or programs are located on storage devices, such as storage 216, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Personal computing device 200 may be, for example, a personal digital assistant (PDA) or a palm-top computing device. Personal computing device 200 may also take the form of a telephone computing device, a tablet computer, or a laptop computer within the scope of the present invention.

Figure 3:
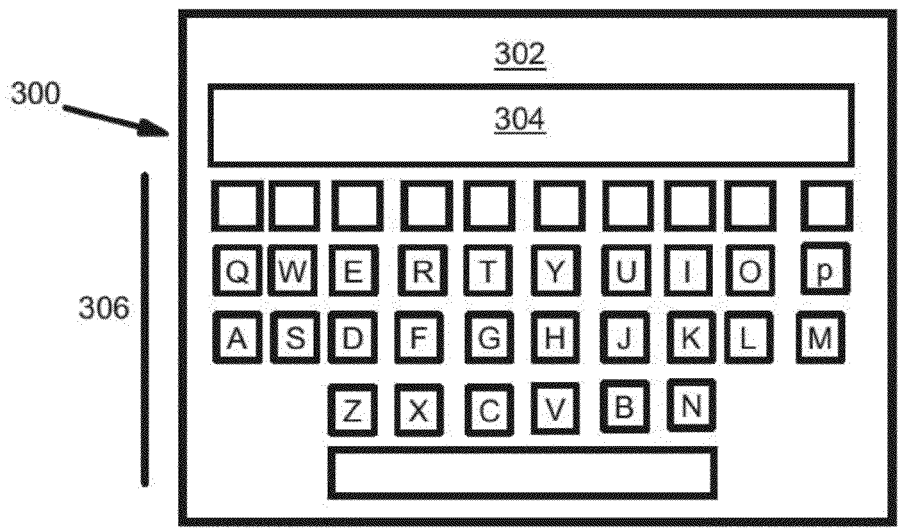
FIG. 3 is a representation of a virtual keyboard generated for display on the device of FIG. 1.

FIG. 3 illustrates a touch screen display in accordance with a preferred embodiment of the present invention. Touch screen display 300 includes an application portion 302, a text input portion 304, and a virtual keyboard 306. In the depicted example, the keyboard layout is similar to a QWERTY keyboard layout. A QWERTY keyboard layout is named after the order of the keys in the upper left portion of the keyboard. Other keyboard layouts, such as the Dvorak keyboard layout, may also be used within the scope of the present invention. The present invention may also apply to other input layouts, such as a numeric keypad or a non-English alphabetic keyboard. Therefore, a word may consist of a string of alphabetic characters, a string of numeric characters, or a combination of alphabetic and numeric characters.

Tapping individual letters on a virtual keyboard is not a natural operation for most users. Holding a stylus is similar to holding a pen or pencil; therefore, users find handwriting more natural with a stylus. When writing with a pen or pencil, cursive writing is a more efficient and fluid style of writing. A user is able to write words more efficiently, because the writing implement leaves the paper less frequently.

As is now known, a "QWER-sive" user input mechanism recognizes gestures that represent words. QWER-sine, pronounced like "cursive," is an input method that allows users to enter words as a single gesture based on a keyboard layout, such as virtual keyboard 306. A user places an implement, such as a stylus for example, in contact with the touch screen over a display of a first letter of a word. The user then drags the stylus, while in contact with the surface of the touch screen, to the next letter of the word, then to the next letter, and so on. The user may then use the keyboard layout to fluidly write whole words in a single gesture. Using a QWER-sive input mechanism, the time between each character entry is minimized and users may eventually be able to repeat gestures from memorization of commonly used words or character combinations.

As words are recognized from input on keyboard layout 306, the words are presented in text input portion 304. If a word or series of words is accepted, the string is sent to an application in application portion 302. In this manner, the user may efficiently and fluidly enter text into a personal computing device.

While the example depicted in FIG. 3 shows a keyboard layout on the display, a user may become increasingly familiar with the keyboard layout and may also memorize gestures for particular words. A large percentage of text in most languages may be represented by a relatively small subset of words. For example, the words "the," "is," "it," and "of are examples of very common words in the English language. A user may memorize the gestures for very common words and execute them without looking at the keyboard layout. The patterns of the gestures may be recognized as loosely tied to the keyboard layout. In fact, for many words, it may not be necessary to display the keyboard layout. Thus, gestures may be entered relative to a keyboard layout that is not displayed. The keyboard layout may be displayed only when expressly requested by the user by selection of a particular button or graphical element, for example.

The use of characters and character combinations in languages has been studied for a number of purposes. Herbert S. Zim, in his classic introductory cryptography text "Codes and Secret Writing", gives the English letter frequency sequence as "ETAON RISHD LFCMU GYPWB VKJXQ Z", the most common letter pairs as "TH HE AN RE ER IN ON AT ND ST ES EN OF TE ED OR TI HI AS TO", and the most common doubled letters as "LL EE SS OO TT FF RR NN PP CC". The 'top twelve' letters comprise about 80% of the total usage. The 'top eight" letters comprise about 65% of the total usage. Letter frequency as a function of rank can be fitted well by several rank functions, with the two-parameter Cocho/Beta rank function being the best. What is here taught leverages this knowledge to improve the QWER-sive input mechanism. In particular, in generating a keyboard layout according to what is here taught, the area allocated to individual characters varies among the character set with larger areas assigned to characters more likely to be used in a language selected by a user.

While the Zim analysis mentioned above related to English, similar studies have been done for many other languages. A representative sample are shown in the following table, which has been abbreviated from original sources in the interest of preserving space here. For each language, the percentage of usage in which a letter appears are given.

| Letter | French | German | Spanish | Portugese | Italian |
|---|---|---|---|---|---|
| a | 7.636% | 6.51% | 12.53% | 14.63% | 11.74% |
| b | 0.901% | 1.89% | 1.42% | 1.04% | 0.92% |
| c | 3.26% | 3.6% | 4.68% | 3.88% | 4.5% |
| d | 3.669% | 5.08% | 5.86% | 4.99% | 3.73% |
| e | 14.715% | 17.4% | 13.68% | 12/57% | 11.79% |
| f | 1.066% | 1.66% | 0.60% | 1.02% | 0.95% |
| g | 0.866% | 3.01% | 1.01% | 1.3% | 1.64% |
| h | 0.737% | 4.76% | 0.70% | 1.28% | 1.54% |
| i | 7.529% | 7.55% | 6.25% | 6.18% | 11.28% |
| j | 0.545% | 0.27% | 0.44% | 0.40% | 0 |
| k | 0.049% | 1.21% | 0.01% | 0.02% | 0 |
| l | 5.456% | 3.44% | 4.97% | 2.78% | 6.51% |
| m | 2.968% | 2.53% | 3.15% | 4.74% | 2.51% |
| n | 7.095% | 9.78% | 6.71% | 5.05% | 6.88% |
| o | 5.378% | 2.51% | 8.68% | 10.73% | 9.83% |
| p | 3.021% | 0.79% | 2.51% | 2.52% | 3.05% |
| q | 1.362% | 0.02% | 0.88% | 1.20% | 0.51% |
| r | 6.533% | 7% | 6.87% | 6.53% | 6.37% |
| s | 7.948% | 7.27% | 7.98% | 7.81% | 4.98% |
| t | 7.244% | 6.15% | 4.63% | 4.74% | 5.62% |
| u | 6.311% | 4.35% | 3.93% | 4.63% | 3.01% |
| v | 1.628% | 0.67% | 0.90% | 1.67% | 2.10% |
| w | 0.114% | 1.89% | 0.02% | 0.01% | 0 |

-continued

| Letter | French | German | Spanish | Portugese | Italian |
|--------|--------|--------|---------|-----------|---------|
| x | 0.387% | 0.03% | 0.22% | 0.21% | 0 |
| y | 0.308% | 0.04% | 0.90% | 0.01% | 0 |
| z | 0.136% | 1.13% | 0.52% | 0.47% | 0.49% |

Referring now to PG. 4, what is there represented is a portion of generated keyboard as shown in FIG. 3. The generated keyboard is for a user who has selected English as the input language. Accordingly, the areas allocated to the letters E and T in the focused on keyboard portion have been enlarged. This enlargement may either be visually apparent to the user (as shown) or concealed from the view of the user, as indicated by the dash lines appearing in FIG. 5.

The enlargement may be either static or dynamic. That is, the enlargement may be always present and assigned to letters most frequently used or may be dynamic, with identification of frequently used letter pairs as identified, for example, by Zim cited above. With a dynamic assignment, selection of an initial letter causes an enlargement of the target area for an anticipated next letter regardless of that successive letter percentage of use. Such dynamic selection may be iterated as successive letters are selected to assemble a text string.

As with known QWER-sine input, user input is received including a gesture that represents a plurality of characters with a shape of the gesture being related to the position of the plurality of characters within the keyboard layout, a string of characters associated with the gesture identified, and the identified string provided as text input. Spell checking, should it proceed with the progress of the gesture, can provide input into the dynamic selection process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon.

Figure 7:
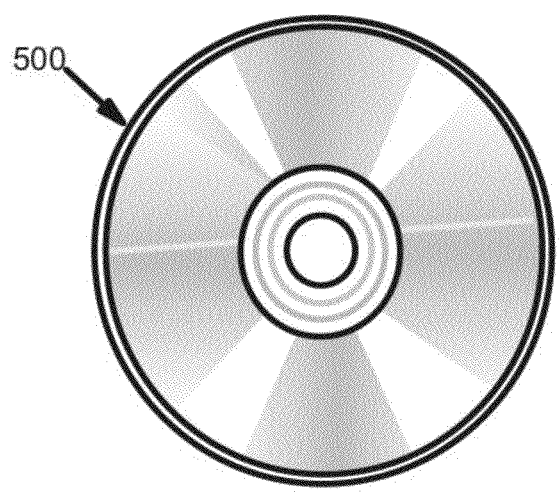
FIG. 7 is a representation of a computer medium bearing computer readable and executable instructions for implementing the technology taught here.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory such as the disc 500 in FIG. 7 (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
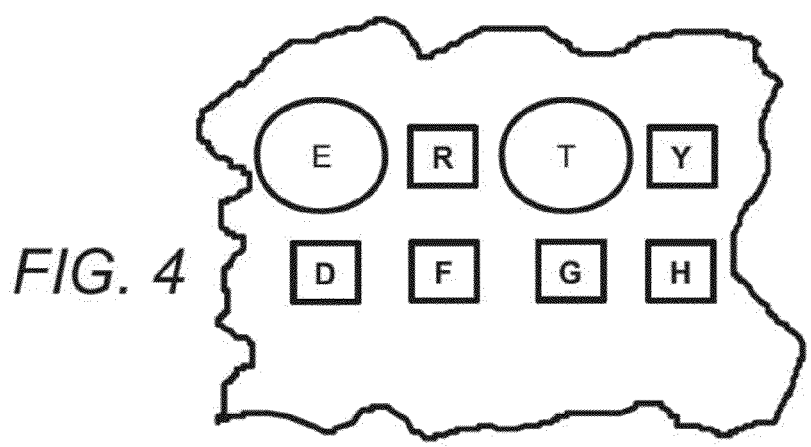
FIG. 4 is a representation of a portion of the keyboard of FIG. 3, illustrating one implementation of the area enlargement contemplated by the technology taught here.
Figure 5:
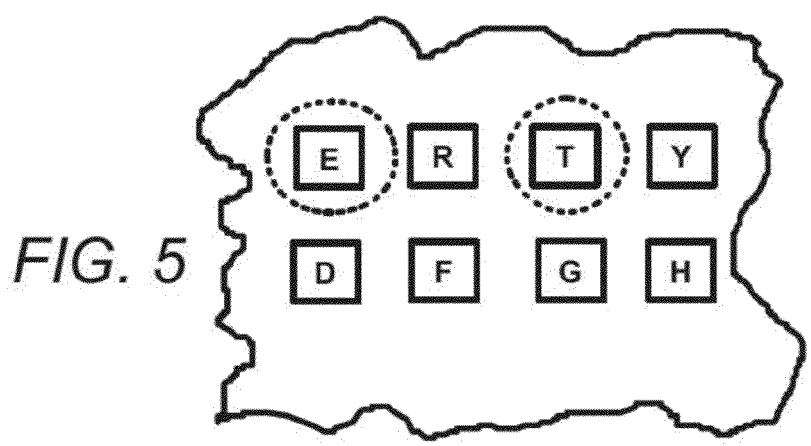
FIG. 5 is a representation like that of FIG. 4, illustrating an alternate implementation.
Figure 6:
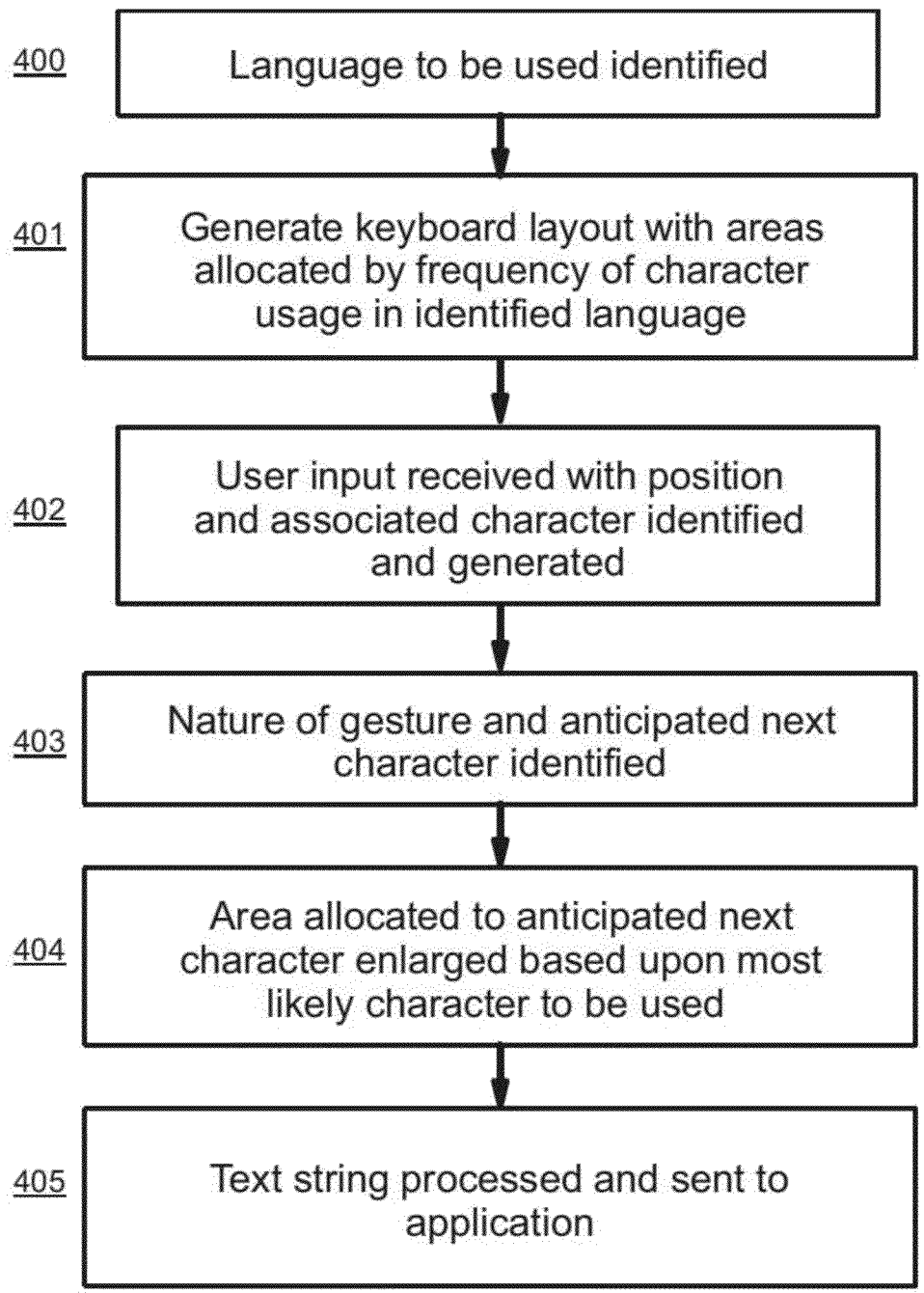
FIG. 6 is a flow chart illustrating certain steps in the method contemplated by the technology taught here.

Referring now to FIG. 6, the flowchart there is somewhat simplified by eliminating duplication of process steps shown more clearly in FIGS. 6A and 6B of U.S. Pat. No. 7,250,938, which has been incorporated by reference into this description. In FIG. 6 of this material, the process begins with identification 400 of the language to be used, which may be by the end user or by the supplier of the device or software. The appropriate keyboard layout is then generated 401 with areas of the layout allocated among the characters of the selected language based upon the frequency of use of the characters in the language. That is, characters more frequently used are allocated a larger area in the layout as compared with characters less frequently used. The allocation of areas may be visible to the user (FIG. 4) or concealed from the view of the user (FIG. 5). The areas typically will be a circular area having a radius accommodating the keyboard layout. Where the allocated areas are concealed from view, the circular area provided may in fact overlap areas shown to the user as being for an adjacent character, thus leading to targeting of a character by a stroke ending short of the specific more frequently used character. For example, a user line may not actually enter the H character box, yet the enlarged target circle registers this as an h possibility (even though it overlaps the G radius). Alternatively, the individual character radii may be ranked as suggested above dependant upon the context of the input, English text input giving a slightly larger radius to characters that are more heavily weighted in common usage in that (English text) context. This would also be functional with alternative keyboard layouts such as Dvorak etc.

As with prior QWER-sive input, user input is received with the position and associated character being identified and generated 402. The nature of the user gesture (change in direction, loop, tick, end) and the anticipated next character is identified 403. The area associated with the anticipated next character may be enlarged based upon the most likely character to be used, and subject to whether such enlargement has already been allocated by the choice of language 403. A text string is processed and sent to an application as, for example, in FIG. 6B of U.S. Pat. No. 7,250,938.

The block diagrams and flowchart in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the drawings and specifications there has been set forth a preferred embodiment of the invention and, although specific terms are used, the description thus given uses terminology in a generic and descriptive sense only and not for purposes of limitation.

What is claimed is:

1. A method for user input comprising:
   generating a keyboard layout and allocating to individual characters areas which vary among the character set with larger areas assigned to characters more likely to be used in a language selected by a user;
   receiving a user input, wherein the user input includes a gesture that represents a plurality of characters and wherein a shape of the gesture is related to the position of the plurality of characters within the keyboard layout;
   responding to the user input by dynamically altering the allocation of areas among the character set to allocate an enlarged area to an anticipated next character based upon the most likely next character to be used in the language selected by the user;
   identifying a string of characters associated with the gesture;
   and
   providing the identified string as text input.

2. A method according to claim 1 wherein the area allocated is visually apparent to the user.

3. A method according to claim 1 wherein the area allocated is concealed from the view of the user.

4. A method according to claim 1 wherein responding to the user input and identifying a string associated with the gesture comprises:
   identifying a starting position;
   recording a character based on the starting position with respect to the keyboard layout; and
   allocating an enlarged area to an anticipated next character based upon the most likely next character to be used in the language selected by the user.

5. A method according to claim 1 wherein responding to the user input and identifying a string associated with the gesture comprises:
   identifying a change in direction;
   recording a character based on a position of the change in direction with respect to the keyboard layout; and
   allocating an enlarged area to an anticipated next character based upon the most likely next character to be used in the language selected by the user.

6. A method according to claim 1 wherein responding to the user input and identifying a string associated with the gesture comprises:
   generating a character based on a position with respect to the keyboard layout;
   allocating an enlarged area to an anticipated next character based upon the most likely next character to be used in the language selected by the user; and
   iterating recording and allocating to assemble a character string.

7. An apparatus accommodating user input comprising:
   an end user device having a processor, a display driven by the processor and memory accessible to said processor; and
   computer executable program code stored in said memory and operating when executed by said processor to:
      generate a keyboard layout and allocate to individual characters areas which vary among the character set with larger areas assigned to characters more likely to be used in a language selected by a user;
      receive a user input, wherein the user input includes a gesture that represents a plurality of characters and wherein a shape of the gesture is related to the position of the plurality of characters within a keyboard layout;
      respond to the user input by dynamically altering the allocation of areas among the character set to allocate an enlarged area to an anticipated next character based upon the most likely next character to be used in the language selected by the user;
      identify a string of characters associated with the gesture; and
      provide the identified string as text input.

8. An apparatus according to claim 7 wherein the area allocated is visually apparent to the user.

9. An apparatus according to claim 7 wherein the area allocated is concealed from the view of the user.

10. An apparatus according to claim 7 wherein responding to the user input and identifying a string associated with the gesture comprises:
    identifying a starting position;
    recording a character based on the starting position with respect to the keyboard layout; and
    allocating an enlarged area to an anticipated next character based upon the most likely next character to be used in the language selected by the user.

11. An apparatus according to claim 7 wherein responding to the user input and identifying a string associated with the gesture comprises:
    identifying a change in direction;
    recording a character based on a position of the change in direction with respect to the keyboard layout; and
    allocating an enlarged area to an anticipated next character based upon the most likely next character to be used in the language selected by the user.

12. An apparatus according to claim 7 wherein responding to the user input and identifying a string associated with the gesture comprises:
    recording a character based on a position with respect to the keyboard layout;
    allocating an enlarged area to an anticipated next character based upon the most likely next character to be used in the language selected by the user; and
    iterating recording and allocating to assemble a character string.

13. An apparatus facilitating a text string input into an end user device which has a processor, a display and memory accessible to said processor, the apparatus comprising:
    a computer readable storage medium; and
    computer readable program code stored in said computer readable storage medium and operable when executed by a processor to:
        generate a keyboard layout and allocate to individual characters areas which vary among the character set with larger areas assigned to characters more likely to be used in a language selected by a user;
        receive a user input, wherein the user input includes a gesture that represents a plurality of characters and wherein a shape of the gesture is related to the position of the plurality of characters within a keyboard layout;
        respond to the user input by dynamically altering the allocation of areas among the character set to allocate an enlarged area to an anticipated next character based upon the most likely next character to be used in the language selected by the user;
        identify a string of characters associated with the gesture; and
        provide the identified string as text input.

14. An apparatus according to claim 13 wherein the area allocated is visually apparent to the user.

15. An apparatus according to claim 13 wherein the area allocated is concealed from the view of the user.

16. An apparatus according to claim 13 wherein responding to the user input and identifying a string associated with the gesture comprises:
    identifying a starting position;
    recording a character based on the starting position with respect to the keyboard layout; and
    allocating an enlarged area to an anticipated next character based upon the most likely next character to be used in the language selected by the user.

17. An apparatus according to claim 13 wherein responding to the user input and identifying a string associated with the gesture comprises:
    identifying a change in direction;
    recording a character based on a position of the change in direction with respect to the keyboard layout; and
    allocating an enlarged area to an anticipated next character based upon the most likely next character to be used in the language selected by the user.

18. An apparatus according to claim 13 wherein responding to the user input and identifying a string associated with the gesture comprises:
    recording a character based on a position with respect to the keyboard layout;
    allocating an enlarged area to an anticipated next character based upon the most likely next character to be used in the language selected by the user; and
    iterating recording and allocating to assemble a character string.

\* \* \* \* \*